United States Patent [19]

Ishigami et al.

[11] Patent Number: 4,468,950
[45] Date of Patent: Sep. 4, 1984

[54] ENGINE VIBRATION TRANSMISSION STRUCTURE

[75] Inventors: Kazuhiro Ishigami; Haruo Yuzawa, both of Yokohama, Japan

[73] Assignee: Nissan Motor Company, Limited, Yokohama, Japan

[21] Appl. No.: 442,591

[22] Filed: Nov. 17, 1982

[30] Foreign Application Priority Data

Nov. 20, 1981 [JP] Japan .................................. 56-186496

[51] Int. Cl.³ ............................................. G01L 23/22
[52] U.S. Cl. ........................................................ 73/35
[58] Field of Search .............. 73/35; 123/41.28, 41.29, 123/41.74, 41.79, 41.8

[56] References Cited

U.S. PATENT DOCUMENTS 2,334,731 11/1943 Szekely ............................ 123/41.29
2,608,961 9/1952 Albinson ......................... 123/41.28

Primary Examiner—James J. Gill
Attorney, Agent, or Firm—Schwartz, Jeffery, Schwaab, Mack, Blumenthal & Koch

[57] ABSTRACT

A structure for use in an internal combustion engine for providing shortened vibration channels through which vibratory forces within engine cylinders are transmitted to a knock sensor attached to the engine on its engine block outer wall. The structure includes a plurality of ribs each extending through a cooling passage between the engine block outer wall and corresponding one of cylinder walls.

3 Claims, 5 Drawing Figures

ENGINE VIBRATION TRANSMISSION STRUCTURE

BACKGROUND OF THE INVENTION

This invention relates to a structure for use in an internal combustion engine for providing shortened vibration channels through which vibratory forces within engine cylinders are transmitted to a knock sensor attached to the engine at an exterior location.

It is the common practice to improve fuel economy in an internal combustion engine by advancing the spark of the engine as close to a value above which knocking occurs as possible and retarding the spark immediately when knocking occurs. For this purpose, spark control circuits have been proposed which can advance and retard the spark of an engine in response to the frequency of occurrence of engine knock. Such a spark control circuit includes a knock sensor attached to an engine at an exterior location where vibratory forces within the engine are translated into voltage signals at the knock sensor output. The spark control circuit also includes a pulse generator connected to the knock sensor for generating pulses to a counter while the knock sensor output is greater than the signal of background vibration produced by normal engine operation without knocking. The count of the counter corresponds to the frequency of occurrence of engine knock.

However, there has been recognized a serious problem in that the location for attachment of the knock sensor to the engine is spaced apart from the engine cylinders so that the vibratory forces produced within the cylinders are attenuated before conducting to the knock sensor.

SUMMARY OF THE INVENTION

The present invention provides a structure for use in a multi-cylinder internal combustion engine including an engine block having an engine block outer wall, a plurality of cylinder walls each defining therein a cylinder, and a cooling passage defined between said engine block outer wall and said cylinder walls. A knock sensor is attached on the engine block outer wall for sensing vibratory forces within the engine and translating the sensed vibratory forces into voltage signal. The structure includes a plurality of ribs each extending through the cooling passage between the engine block outer wall and corresponding one of the cylinder walls to provide a shortened vibration channel through which vibratory forces within the associated cylinder are transmitted to the knock sensor.

BRIEF DESCRIPTION OF THE DRAWINGS

The details as well as other features and advantages of this invention are set forth below and are shown in the accompanying drawings, in which.

DETAILED DESCRIPTION OF THE INVENTION

Figure 1:
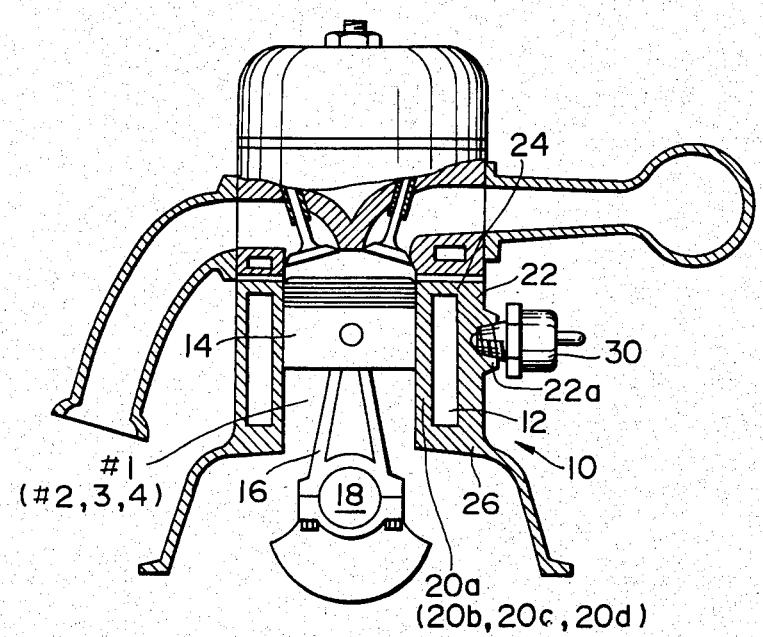
FIG. 1 is a fragmentary vertical sectional view of a portion of a conventional four-cylinder internal combustion engine.
Figure 2:
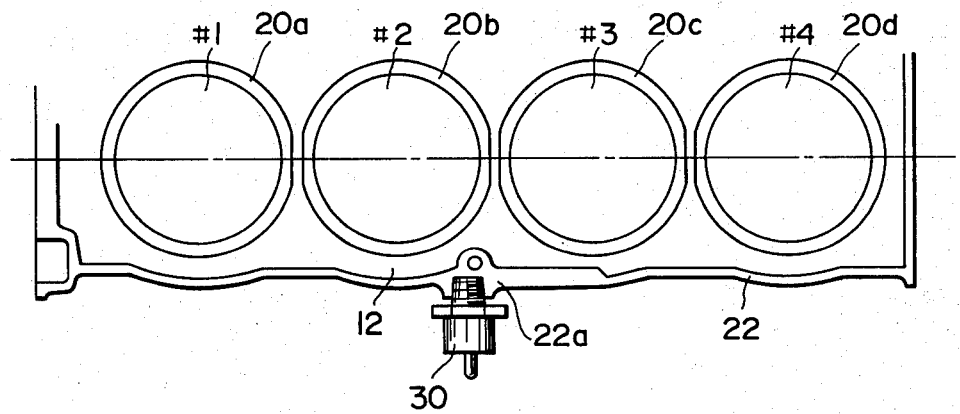
FIG. 2 is a fragmentary horizontal sectional view of the engine of FIG. 1.

Prior to the description of the preferred embodiment of the present invention, we shall briefly describe the prior art structure in FIGS. 1 and 2 in order to specifically point out the difficulties attendance thereon.

Referring to FIGS. 1 and 2, in particularly, an internal combustion engine is shown having four cylinders #1, #2, #3 and #4 in an in-line relationship. The engine includes a usual engine block 10 having a cooling passage 12 therethrough, in which water is circulated in a conventional manner, to form on its opposite sides an engine block outer wall 22 and a plurality of cylinder walls 20a, 20b, 20c and 20d. Pistons 14 are fitted in the cylinders #1 to #4 and are coupled through connecting rods 16 to a crankshaft 18. The cooling passage 12 is defined by the cylinder walls, the engine block outer walls 22, an upper deck 24, and a lower deck 26. The engine block outer wall 22 has substantially at its center a boss 22a formed with an internally threaded recess. The knock sensor 30 has a threaded extension which is threadably engaged with the internally threaded recess of the boss 22a.

With such a structure, the vibratory forces within the cylinders due to internal combustion conduct along long paths from the cylinder walls 20a, 20b, 20c and 20d through the upper and lower decks 24 and 26 to the engine block outer wall 22 on which the knock sensor 30 is attached and are attenuated greatly before conducting to the knock sensor 30. Thus, the knock sensor 30 can sense small knock in the cylinders #1 and #4 located apart a long distance from the knock sensor with considerable difficulty.

Figure 3:
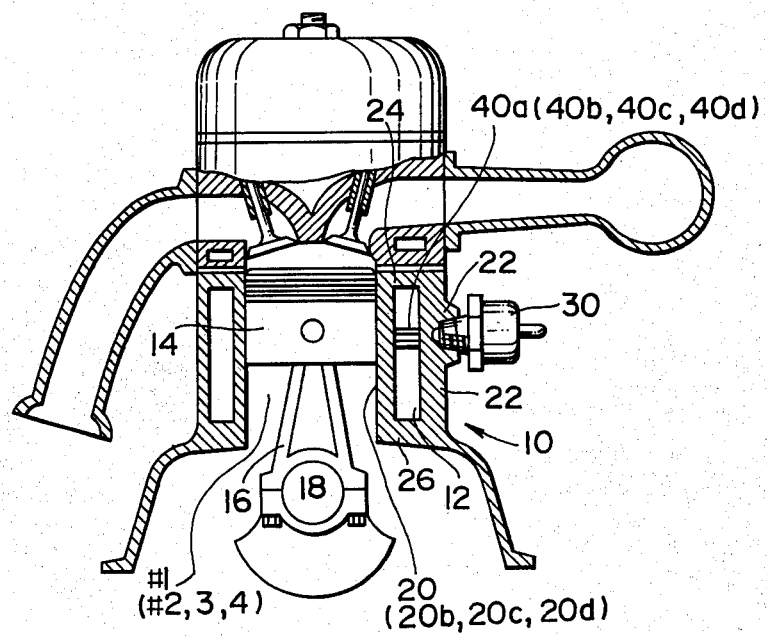
FIG. 3 is a fragmentary vertical sectional view of a portion of an internal combustion engine upon which is employed the rib structure of the present invention.
Figure 4:
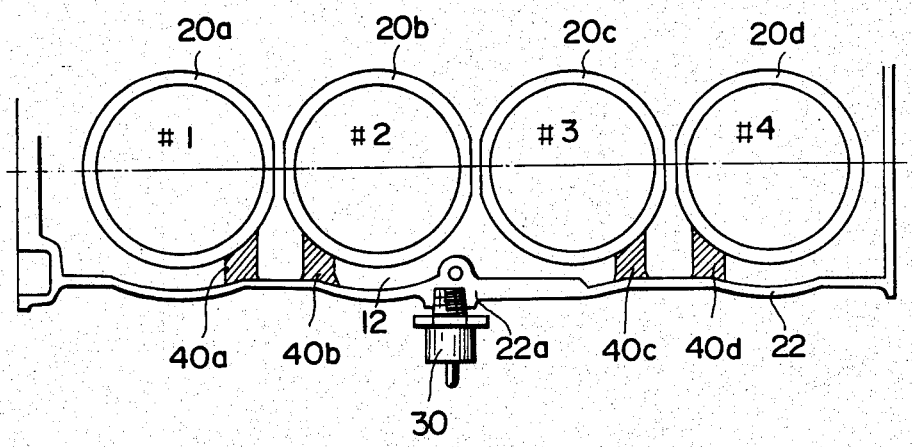
FIG. 4 is a fragmentary horizontal sectional view of the engine of FIG. 3.

Referring now to FIGS. 3 and 4, there is illustrated one embodiment of a structure made in accordance with the present invention. Parts in FIGS. 3 and 4 which are like those in FIGS. 1 and 2 have been given the same reference character.

In this embodiment, each of the cylinder walls 20a, 20b, 20c and 20d is connected to the engine block outer wall 22 by a rib 40a, 40b, 40c or 40d which extends through the cooling passage 12 and provides a shortened vibration channel through which the vibratory forces within the associated cylinder are transmitted to the knock sensor 30. The rib is effective to transmit the vibratory forces to the knock sensor 30 with minimized attenuation or improved transmissibility. This structure permits the knock sensor 30 to get more sensitive to the vibratory forces within the cylinders so as to ensure that it can sense small knocking which occurs in the cylinders #1 and #4 located apart a long distance from the knock sensor 30.

Preferably, the location of each of the ribs 40a, 40b, 40c and 40d is so that the length of the shortened vibration channel is substantially equal to that of the other shortened vibration channels. For four cylinder engines, the ribs 40a and 40d associated with the outer cylinders #1 and #4 and the respective adjacent ribs 40b and 40c associated with the inner cylinders #2 and #3 are located as close to each other as possible, as best shown in FIG. 4. It is to be understood that for two cylinder engines, the rib associated with one cylinder and the rib associated with the other cylinder may be located symmetrically with respect to the knock sensor 30. With this structure, the sensitivity of the knock sensor 30 to engine knocking is maintained substantially the same for each of the cylinders regardless of the position of the cylinder with respect to the knock sensor 30. This eliminates the requirement of changing, for each of the cylinders, the reference level with which the output of the knock sensor is compared and permits the use of the knock sensor with a simplified spark control circuit.

Figure 5:
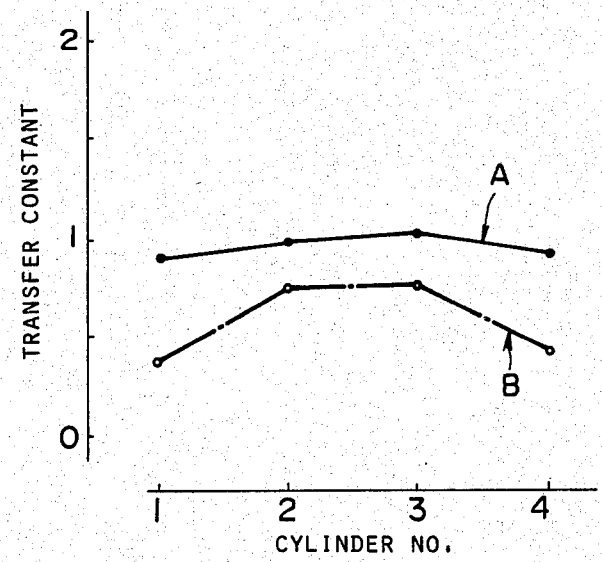
FIG. 5 is a comparative graph of transfer constant curves between conventional engines and engines with the rib structure of the present invention.

The dramatic effect the rib structure of the present invention has on the transfer constant obtained for each of the cylinders #1 to #4 is illustrated in FIG. 5 wherein each of the plotted transfer constant values has been measured by calculating a ratio between the output of the knock sensor 30 and the output of a microphone positioned near the engine block outer wall 22 while generating, in each cylinder, engine knock whose intensity is so that the microphone produces a constant output. Curve A illustrates measured values of the transfer constant for the cylinders #1 to #4 of an engine having the rib structure of the present invention as illustrated in FIGS. 3 and 4. It can be seen from the curve that for all of the cylinders, the measured transfer constant values are high and substantially at the same level. In contrast, curve B shows measured values of the transfer constant for the cylinders #1 to #4 of a conventional engine as illustrated in FIGS. 1 and 2. It is quite evident that the measured transfer constant values are rather lower for all of the cylinders than those obtained for the engine of the present invention and that the measured transfer constant values for the outer cylinders #1 and #4 located apart a longer distance from the knock sensor 30 are considerably lower than those for the inner cylinders #2 and #3.

There has been provided, in accordance with the present invention, an engine vibration transmission structure for use in a multi-cylinder internal combustion engine. The structure includes a plurality of ribs each extending through a cooling passage between an engine block outer wall and corresponding one of cylinder walls to provide shortened vibration channel through which vibratory forces within the corresponding engine cylinder are transmitted to a knock sensor attached on the engine block outer wall. Thus, the vibratory forces are transmitted to the knock sensor with minimized attenuation. In addition, the ribs are located so that the shortened vibration channels have substantially the same length. This equalize the sensitivity of the knock sensor to engine knocking for each cylinder regardless of the position of the cylinder with respect to the knock sensor.

While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A structure for use in a multi-cylinder internal combustion engine including an engine block having an engine block outer wall, a plurality of cylinder walls each defining therein a cylinder, a cooling passage defined between said engine block outer wall and said cylinder walls, and a knock sensor attached on said engine block outer wall for sensing vibratory forces within said engine and translating the sensed vibratory forces into a voltage signal, said structure comprising a plurality of ribs each extending through said cooling passage between said engine block outer wall and a corresponding one of said cylinder walls to provide a shortened vibration channel through which vibratory forces within the associated cylinder are transmitted to said knock sensor, said ribs being located to substantially equalize the length of said shortened vibration channels extending from said respective cylinder walls to said knock sensor.

2. The structure of claim 1, wherein said ribs are located symmetrically with respect to said knock sensor.

3. The structure of claim 2, wherein said engine has four cylinders in an in-line relationship and where said ribs associated with outer two cylinders and said respective adjacent ribs associated with inner two cylinders are located close to each other.

* * * * *